United States Patent
Bigby et al.

(10) Patent No.: US 10,032,176 B2
(45) Date of Patent: Jul. 24, 2018

(54) REAL TIME STATISTICS EXTRACTION FROM ARBITRARY ADVERTISING AUDIENCES

(75) Inventors: Michael Bigby, Sunnyvale, CA (US); Lucian Vlad Lita, Sunnyvale, CA (US); Kurt Peterson, San Jose, CA (US); Maojin Jiang, Mountain View, CA (US); Guohan Gao, San Jose, CA (US); Todd Enerson, San Mateo, CA (US)

(73) Assignee: BLUE KAI, INC., Seattle, WA (US)

( * ) Notice: Subject to any disclaimer, the term of this patent is extended or adjusted under 35 U.S.C. 154(b) by 23 days.

(21) Appl. No.: 12/860,789

(22) Filed: Aug. 20, 2010

(65) Prior Publication Data

US 2012/0047013 A1 Feb. 23, 2012

(51) Int. Cl.
G06Q 30/00 (2012.01)
G06Q 30/02 (2012.01)

(52) U.S. Cl.
CPC ......... *G06Q 30/02* (2013.01); *G06Q 30/0251* (2013.01); *G06Q 30/0254* (2013.01)

(58) Field of Classification Search
USPC ......... 705/14.41, 14.42, 14.43, 14.49, 14.52, 705/14.66, 14.73; 709/224, 226
See application file for complete search history.

(56) References Cited

U.S. PATENT DOCUMENTS 6,950,821 B2 9/2005 Faybishenko et al.
7,047,206 B1 5/2006 Schultze
(Continued)

FOREIGN PATENT DOCUMENTS

| JP | 2001117851 A | 4/2001 |
|---|---|---|
| KR | 20000063889 A | 11/2000 |
| KR | 20010084050 A | 9/2001 |

OTHER PUBLICATIONS

International Search Report and Written Opinion for International Patent Application No. PCT/US2009/036387 dated Oct. 8, 2009.
(Continued)

*Primary Examiner* — Luis A Brown
(74) *Attorney, Agent, or Firm* — Kilpatrick Townsend & Stockton LLP

(57) ABSTRACT

A system, method, apparatus, and processor readable storage media are described for real-time computation of statistics between audiences including, but not limited to, correlations, comparative metrics, and/or other statistical analysis for the audiences. Embodiments enable a user to specify a query that defines a specific audience for analysis in real-time. A past time period may be determined that indicates the amount of historical data that is to be analyzed to generate the statistical comparisons and/or correlations. Employing the user-specified query, statistical comparisons and/or correlation may be provided, based on an analysis of retrieved historical audience data for the time period. Embodiments may also enable a user to generate new statistics in real-time through modification of the audience in one or more iterations. Embodiments may also enable a user to filter, sort, and search through audiences by setting desired statistical boundaries for the resulting audience set.

39 Claims, 9 Drawing Sheets

(56) References Cited

U.S. PATENT DOCUMENTS

| | | | |
|---|---|---|---|
| 7,996,456 B2* | 8/2011 | Gross | 709/200 |
| 2003/0171990 A1 | 9/2003 | Rao et al. | |
| 2005/0114225 A1 | 5/2005 | Longman et al. | |
| 2005/0159996 A1* | 7/2005 | Lazarus et al. | 705/10 |
| 2005/0234811 A1 | 10/2005 | Herman et al. | |
| 2006/0041500 A1 | 2/2006 | Diana et al. | |
| 2006/0195385 A1 | 8/2006 | Khetrapal et al. | |
| 2006/0200360 A1 | 9/2006 | Razletovskly | |
| 2006/0282533 A1 | 12/2006 | Steelberg et al. | |
| 2007/0162377 A1 | 7/2007 | Williams | |
| 2008/0077505 A1 | 3/2008 | Ilechko et al. | |
| 2008/0189169 A1* | 8/2008 | Turpin et al. | 705/10 |
| 2008/0201205 A1 | 8/2008 | Rose et al. | |
| 2008/0249832 A1 | 10/2008 | Richardson et al. | |
| 2008/0275753 A1* | 11/2008 | Protheroe et al. | 705/8 |
| 2009/0076907 A1 | 3/2009 | Litwin et al. | |
| 2009/0094196 A1 | 4/2009 | Piwowarski et al. | |
| 2009/0228397 A1 | 9/2009 | Tawakol et al. | |
| 2010/0057556 A1 | 3/2010 | Rousso et al. | |
| 2010/0125665 A1* | 5/2010 | Simpson | G06F 11/3409 709/224 |
| 2010/0198655 A1* | 8/2010 | Ketchum et al. | 705/10 |
| 2010/0293057 A1 | 11/2010 | Haveliwala et al. | |
| 2011/0035273 A1* | 2/2011 | Parikh et al. | 705/14.42 |
| 2011/0119136 A1 | 5/2011 | Eldreth et al. | |
| 2011/0131205 A1 | 6/2011 | Iyer et al. | |
| 2011/0225026 A1 | 9/2011 | Ketchum | |
| 2012/0047005 A1 | 2/2012 | Connelly et al. | |
| 2012/0047013 A1 | 2/2012 | Bigby et al. | |

OTHER PUBLICATIONS

Office Communication for U.S. Appl. No. 12/399,796 dated Feb. 2, 2011.

Final Office Action for U.S. Appl. No. 12/860,812 dated Sep. 24, 2014.

Official Communication for U.S. Appl. No. 12/399,796 dated Dec. 12, 2013.

Official Communication for U.S. Appl. No. 12/399,796 dated Feb. 3, 2011.

Non-final Office Action for U.S. Appl. No. 12/860,812 dated Apr. 9, 2014, 17 pages.

Final Office Action for U.S. Appl. No. 12/399,796 dated May 14, 2014, 31 pages.

Advisory Action for U.S. Appl. No. 12/399,796 dated Oct. 2, 2013, 3 pages.

Official Communication for U.S. Appl. No. 12/399,796 dated Jul. 22, 2011.

Official Communication for U.S. Appl. No. 12/399,796 dated Mar. 27, 2013.

Official Communication for U.S. Appl. No. 12/399,796 dated Aug. 2, 2013.

Official Communication for U.S. Appl. No. 12/860,812 dated Nov. 9, 2012.

Official Communication for U.S. Appl. No. 12/860,812 dated Jun. 4, 2013.

Official Communication for U.S. Appl. No. 12/860,812 dated Aug. 13, 2013.

Non-final Office Action for U.S. Appl. No. 12/399,796 dated Mar. 25, 2015.

Final Office Action dated Oct. 29, 2015 for related U.S. Appl. No. 12/399,796.

Advisory Action for related U.S. Appl. No. 12/399,796 dated Mar. 23, 2016.

Non-final Office Action dated May 13, 2016 for related U.S. Appl. No. 12/860,812.

Final Office Action dated Sep. 19, 2016 for related U.S. Appl. No. 12/860,812.

* cited by examiner

REAL TIME STATISTICS EXTRACTION FROM ARBITRARY ADVERTISING AUDIENCES

FIELD OF ART

The present invention is directed to managing an exchange of information, and more particularly, to using historical advertising audience data to compute and project arbitrary audience statistics based on user-specified queries in real time, and to compare, contrast, and/or correlate different audiences based on user-specified queries in real time.

BACKGROUND

Information regarding users of web sites (e.g. a consumer or potential consumer) is often a hidden and fragmented entity on the web. In some situations, an advertiser or web publisher may not have access to information for one or more web users' behavior on various sites on the web. Further, an advertiser may not be able to predict in real-time the audience of a proposed advertising campaign or determine audience correlations between two or more audiences (e.g. user populations). It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF EMBODIMENTS

Figure 1:
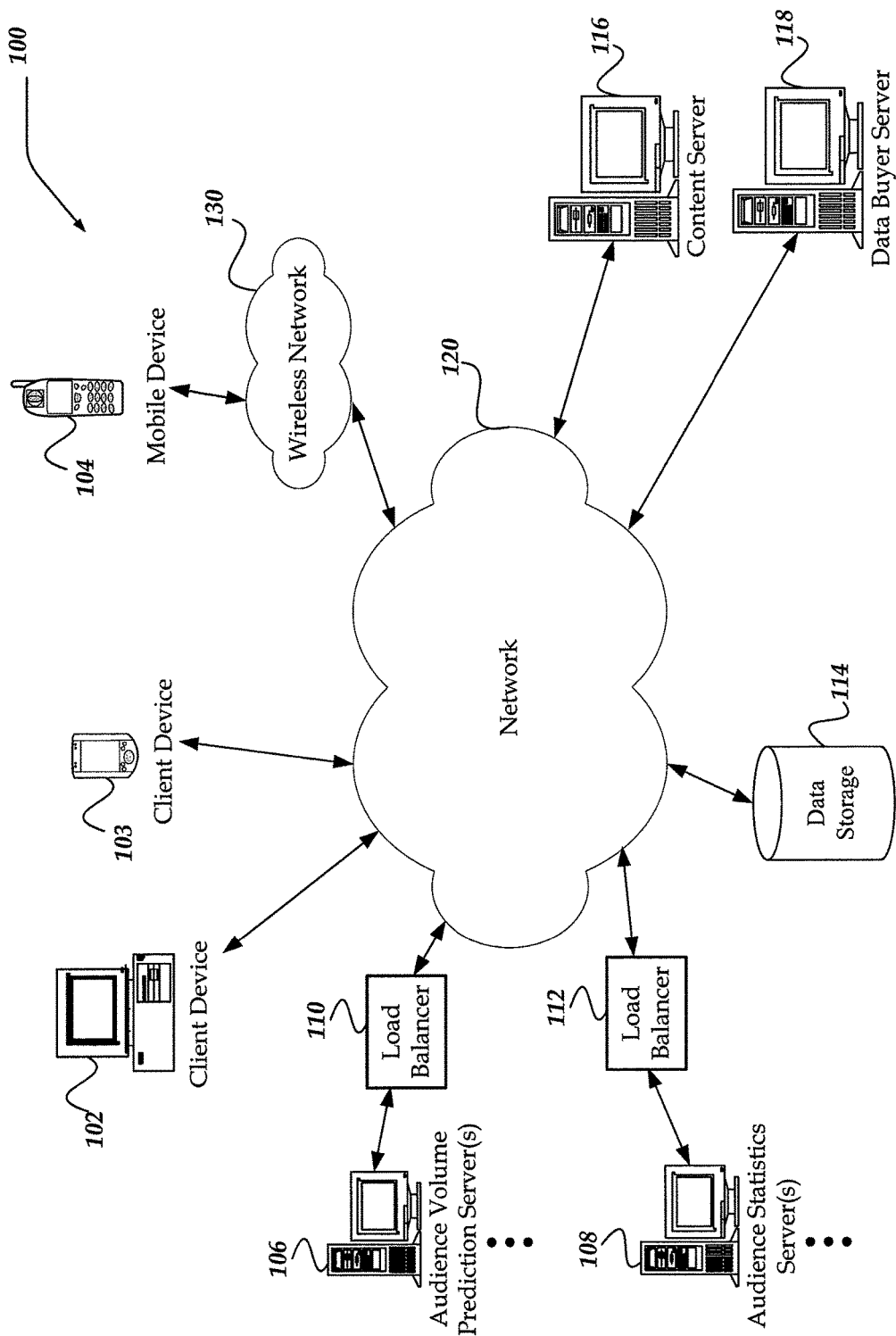
FIG. 1 illustrates an example of a system in which embodiments of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, media or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term audience generally refers to a collection of people who have exhibited in the past or are likely to exhibit in the future a set of online or offline behaviors and actions, have otherwise directly or indirectly communicated and/or exhibited a predisposition towards or predilection for certain products, events, or entities, and/or have directly or indirectly indicated their affinity, inclusion or exclusion in certain groups (e.g. demographic) or categories. Lack of behavior and negative affinity could also be used as defining qualities of an audience. Such people may be web users who have exhibited certain online behavior (e.g. browsing, search, purchase, Really Simple Syndication (RSS) feed, social network activity, forum posting, and the like).

The term audience may also refer to or incorporate a set of users who have visited a particular website or set of websites. Examples of audience of this type include a) people who visited a specific online bookstore website, and b) women interested in green technology who visited three pre-specified automobile comparison websites sometime in the last month. The latter example combines demographic, site-visiting, and in-market audience components. Some embodiments may enable the user requesting the audience forecast to issue queries related to their own website(s) (e.g. for retargeting purposes). For example, an audience may be defined as women between the ages of 30 and 50, who are in market for European travel, and who have visited my website A but not my website B in the last 60 days.

In some embodiments, various audience components may be pertinent to an advertising campaign, data modeling, audience analysis and optimization, and the like.

The term audience may also refer to the collection of people who see, experience, or are otherwise exposed to or potentially exposed to a campaign such as an advertising campaign, a promotional campaign, an informational campaign, or the like. Such people may be web users who may experience a campaign through advertisements placed on web sites or other web services. Such people may also be consumers who may be exposed to advertising through virtually any medium, including but not limited to television, radio, print, physical displays, and the like. As used herein, person is a broad term that encompasses an individual who may be potentially exposed to a campaign through any medium. A person may also be referred to as a consumer, which is meant broadly as a person who may purchase, express an interest in, or otherwise to exposed to information regarding a good and/or service for sale or otherwise provided at any time during the past, present and/or future.

As used herein, the term audience volume generally refers to a number of people in an audience. In some embodiments, audience volume may be an exact number of individual people. However, the invention is not so limited. In some embodiments, audience volume may be a more or less approximate count of the number of people in an audience, estimated by virtually any estimation process.

As used herein, the term category generally refers to a subject or a topic of data for people in an audience. For example, data for a person who purchased an SUV may be associated with a category of "SUV consumer" and/or broader categories of "automobile consumer" or "light truck consumer." Further, categories may be associated with broad category types. For example, categories related to particular markets for goods and/or services may be classified into a market or in-market type of category. Demographic type categories may include categories related to virtually any demographic statistic, including but not limited to age and gender of a person. Location type categories may be related to geographical location definitions of varying scope. For example, location type categories may include "United States residents", "west coast U.S. residents", "California residents", "Los Angeles County residents", "Burbank residents", and so forth. Seasonal category types may include categories related to particular times of year, seasons, periods of time, and the like. For example, data related to user activities during the winter may be classified in a winter category. Other types of categories may be supported by embodiments without departing from the scope or spirit of the claimed invention.

As used herein, the term user generally refers to a person who is acting as a user of the claimed invention, for example a user who is specifying a query for audience volume prediction, receiving the results of the audience volume prediction, and/or modifying the query to tune the audience volume prediction. In some embodiments, the user may be a data buyer seeking an audience volume prediction prior to launching an advertising campaign to target a particular audience.

As used herein, the term "time period" may generally refer to either a contiguous or non-contiguous period of time. A time period may be specified in terms of specific time(s) of day (e.g. 1:00 pm), general time(s) of day (e.g. afternoon), date(s), day(s) of the week (e.g. Tuesday), types of day(s) of the week (e.g. weekday, weekend), month(s) of the year, season(s) of the year, holiday(s), holiday season(s), and the like. A time period may be a specified range of time (e.g. from date X to date Y), a span of time immediately prior to or before a particular date (e.g. the month prior to date X), or a span of time generally prior to a particular date (e.g. any month prior to date X). A time period may be non-contiguously defined as omitting dates (e.g. the month prior to date X except for weekend days). In general, time period as used herein may encompass virtually any description of time.

Briefly stated, embodiments of the invention are directed toward real-time computation of audience statistics through analysis of historical audience data, and comparing, contrasting, and/or correlating two or more audiences. This real-time data processing and statistical computation allows interactive tuning of audiences to select for one or more properties (e.g. volume to correlation tradeoff). Some embodiments may enable a user to specify a query defining an audience to be used to determine one or more other audiences that are correlated with the defined audience. Such a query may be a Boolean combination of various audience categories. Further a past time period may be determined that indicates the amount (e.g. the last week, last month, last year, and the like) of historical data that is to be analyzed to determine the correlated audience(s). Employing the user-specified query and user-specified statistics (metrics), a set of audiences and/or computed statistics may be provided to the user in real time, based on a real-time analysis of retrieved historical audience data for the past time period. Embodiments may also enable a user to tune the audience volume and/or correlations through modification of the query in one or more iterations, until the user is satisfied with the calculated audience and/or correlated audience(s). Parallel processing of data retrieval and/or analysis of data by a cluster of servers may enable audience calculations and/or correlations to be generated and provided in real time.

The following scenarios are non-limiting examples of operations that may be performed by embodiments.

Example 1

A user is interested finding audiences (e.g. populations) that are correlated to a specified audience "women between the ages of 30 and 50 in market for luxury cars". The user requests analysis using both Pearson and Spearman correlation statistics, and based on the past 60 days of online and offline data (e.g. behavioral data, demographic data, geographic data, and the like). Embodiments will provide to the user in real time a list of other audiences that are correlated to the specified audience, e.g. "people in market for jewelry", "international flyers to exotic destinations who frequently visit travel site X", "members of book clubs, living in New Jersey, who are interested in tennis". Generally, any type of correlation and/or audience definition may be employed without departing from the spirit or scope of the invention.

Example 2

A user specifies two audiences and requests a level of correlation between the two. For example, a user may request the Pearson correlation (or other correlation metric) between a first audience "women between the ages of 30 and 50 in market for luxury cars" and a second audience "visitors of site X".

Example 3

A user may specify an audience, for example "women between the ages of 30 and 50 in market for luxury cars". The user may also request a computation of the total count (e.g. sum) of categories, online actions, and/or set of behaviors exhibited in a specified period of time. Further, variance, bias, and/or other statistics can be requested and computed in real-time based on historical audience data.

Audience correlation and other statistical analysis methods are described in more detail with respect to FIGS. 4-9.

Example Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client devices 102-103, mobile device (e.g. mobile client device) 104, network 120, wireless network 130, one or more audience volume prediction servers 106, one or more audience statistics servers 108, load balancers 110 and 112, data storage 114, content server 116 and data buyer server 118. Network 120 is in communication with and enables communication between each of the elements of system 100. Wireless network 130 further enables communication with wireless devices such as mobile device 104.

Client devices 102-104 may include virtually any computing device capable of receiving and sending a message over a network, and/or to and from another computing device. The set of such devices may include devices that typically connect using a wired communications medium such as personal computers, multiprocessor systems, microprocessor-based or programmable consumer electronics, network PCs, and the like. Further, client devices 102-104 may include any device that is capable of connecting via a wireless communication medium such as a personal digital assistant (PDA), pocket PC, wearable computer, portable computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of the preceding devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 120 is configured to couple one computing device to another computing device, enabling them to communicate. Network 120 is enabled to employ any form of computer readable media for communicating information from one electronic device to another. Also, network 120 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, switch and/or other network appliance may act as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 120 is constructed for use with various communication protocols and technologies, including transmission control protocol/interne protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Wireless network 130 may include wireless interfaces, wireless forms of communication media, and/or wireless links such as cellular networks, satellite links. These may include wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like.

The media used to transmit information in communication links as described above may generally include any media that can be accessed by a computing device. Such computer-readable media may include non-transitory media such as computer readable storage media, which also may be referred to as processor readable storage media. Computer-readable media may also include transitory wired and/or wireless communication media, or any combination thereof. Additionally, computer-readable media typically embodies computer-readable instructions, data structures, program modules, or other data. Such data may be stored on computer readable storage media. Such data may also be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Audience volume prediction server(s) 106, audience statistics server(s) 108, content server 116, and/or data buyer server 118 may comprise multiple computing devices, components of a single computing device, or a single device with multiple software features. In some embodiments, audience volume prediction server(s) 106 and/or audience statistics server(s) 108 may comprise a cluster of servers, such that audience statistics extraction (e.g. audience correlation, volume prediction, and the like) functionality is shared among the servers of the cluster in a load-balanced and/or parallel processing. In some embodiments, system 100 may include load balancers 110 and 112 or other network devices that manage the load balancing of tasks among audience volume prediction server(s) 106 and/or audience statistics server(s) 108 respectively.

In some embodiments, audience statistics server(s) 108 may use external data storage 114 for storing audience data used for audience volume prediction and/or audience correlation. In some embodiments, audience volume prediction server(s) 106 and/or audience statistics server(s) 108 may use internal data storage for storing audience data.

Content server 116 may provide content such as web sites, online journals (e.g., blogs), photos, reviews, online services such as messaging, search, news, shopping, advertising, travel services, or virtually any other content and/or services. While providing such content or services, content server 116 may gather information about persons who access the provided content (e.g., web users, consumers and/or potential consumers), including but not limited to information such as products viewed or purchased, services viewed or purchased, articles read, content searches and the like. The gathered information may be collected, stored, correlated, or otherwise analyzed at an exchange server (not shown in FIG. 1). Such an exchange server and exchange service is described further in U.S. patent application Ser. No. 12/399,796, titled EXCHANGE FOR TAGGED USER INFORMATION WITH SCARCITY CONTROL, hereby incorporated by reference. Briefly, an exchange server may organize or reorganize the consumer information collected from one or more content servers such as content server 116. An exchange server may facilitate the selling or providing of the collected consumer information to one or more buyers, by auction or otherwise. In some embodiments, data buyer server 118 may generally enable buyers to review, bid on, or otherwise access the collected consumer information. In some embodiments, the collected consumer information may be audience data used by audience volume prediction server(s) 106 and/or audience statistics server(s) 108.

System 100 may also include data buyer server 118 that enables a data buyer or potential data buyer to use services provided by audience volume prediction server(s) 106 and/or audience statistics server(s) 108. In some embodiments, a user of data buyer server 118 may access client application(s) installed on data buyer server 118 to access services provided by audience volume prediction server(s) 106 and/or audience statistics server(s) 108, as discussed further herein. In some embodiments, a user of data buyer server 118 may access remote and/or network application(s) hosted on audience volume prediction server(s) 106 and/or audience statistics server(s) 108 to access services.

Example Client Device

Figure 2:
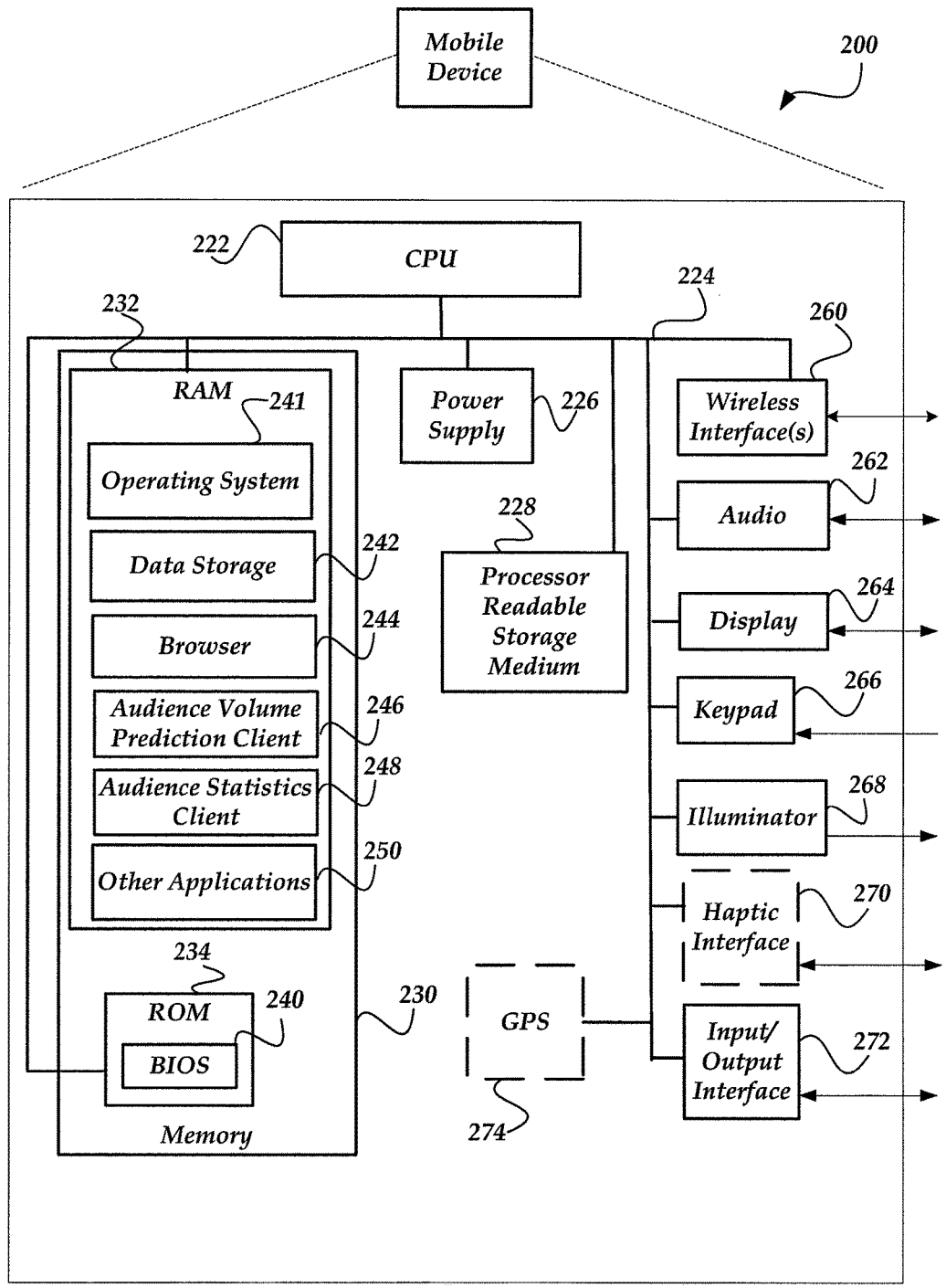
FIG. 2 illustrates an example of a mobile device that may be included in a system implementing embodiments of the invention.

FIG. 2 shows an example mobile device 200, according to an embodiment of the claimed invention. In one embodiment, mobile device 200 is a mobile client device, such as a laptop computer. Another example of a mobile device is a PDA or a cellular telephone that is arranged to send and receive voice communications and messages such as SMS messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, mobile device 200 may comprise any mobile or stationary electronic device. Such devices include personal computers, laptops, palmtops, PDAs, handheld computers, cellular telephones, smart phones, pagers, radio frequency (RF) devices, infrared (IR) devices, integrated devices combining one or more of the preceding devices, and the like. Mobile device 200 may also comprise other electronic devices such as multiprocessor systems, microprocessor-based or programmable consumer electronics, network PCs, wearable computers, and the like.

Mobile device 200 may include many more, or fewer, components than those shown in FIG. 2. However, the components shown are sufficient to disclose an illustrative embodiment for practicing the present invention. As shown in the figure, mobile device 200 includes a central processing unit (CPU) 222 in communication with a mass memory 230 via a bus 224.

Mass memory 230 may include RAM 232, a ROM 234, and other storage means. Mass memory 230 illustrates an example of computer storage media for storage of information such as computer readable instructions, data structures, program modules or other data. Mass memory stores a basic input/output system ("BIOS") 240 for controlling low-level operation of client device 200. The mass memory also stores an operating system 241 for controlling the operation of mobile device 200. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 230 further includes one or more data storage units 242, which can be utilized by mobile device 200 to store data used by various programs, applications, software modules, and the like. Mass memory 230 may also include programs, applications, and/or software modules. Browser 244 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web.

Mass memory 230 may also include an audience volume prediction client 246 that enables a user to access audience volume prediction functionality of the claimed invention, provided by audience volume prediction server(s) 106, described further herein. In some embodiments, mass memory 230 may also include an audience statistics client 248 that enables a user to access audience statistics functionality provided by audience statistics server(s) 108. In some embodiments, a user of mobile device 200 may access audience volume prediction functionality and/or audience statistics functionality through browser 244, by accessing web services hosted by audience volume prediction server(s) 106 and/or audience statistics server(s) 108. In some embodiments, access to functionality of the audience volume prediction server(s) and/or audience statistics server(s) may be provided to the client via an API. A data buyer and/or third party may create one or more applications that employ the API to access the prediction and/or statistics functionality. Mass memory 230 may also include other applications 250.

Mobile device 200 may also include a processor readable storage media 228. Processor readable storage media may include volatile, nonvolatile, removable, and non-removable media implemented in any method or technology for storage of information, such as computer- or processor-readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device. Processor readable storage media may also be referred to herein as computer readable storage media.

Mobile device 200 also includes a power supply 226, one or more wireless interfaces 260, an audio interface 262, a display 264, a keypad 266, an illuminator 268, an input/output interface 272, an optional haptic interface 270, and an optional global positioning systems (GPS) receiver 274. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station, or directly with another mobile device. Wireless interface 260 may include circuitry for coupling mobile device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 262 is arranged to produce and/or receive audio signals such as the sound of a human voice, music, and the like. For example, audio interface 262 may be coupled to a speaker and microphone (not shown) to enable telecommunication with others and/or generate an audio acknowledgement for some action. Display 264 may be a liquid crystal display (LCD), gas plasma, light emitting diode (LED), or any other type of display used with a client device. Display 264 may also include a touch sensitive screen arranged to receive input from an object such as a stylus or a digit from a human hand.

Keypad 266 may comprise any input device arranged to receive input from a user. For example, keypad 266 may include a keyboard, a push button numeric dial, or the like. Keypad 266 may also include command buttons that are associated with selecting and performing changeable processes. Illuminator 268 may provide a status indication and/or provide light. Illuminator 268 may remain active for specific periods of time or in response to events. For example, when illuminator 268 is active, it may backlight the buttons on keypad 266 and stay on while the client device is powered. Also, illuminator 268 may backlight these buttons in various patterns when particular actions are performed, such as dialing another client device. Illuminator 268 may also cause light sources positioned within a transparent or translucent case of the mobile device to illuminate in response to actions.

Client device 200 may also include input/output interface 272 for communicating with external devices, such as a headset, or other input or output devices not shown in FIG. 2. Input/output interface 272 can utilize one or more communication technologies, such as USB, infrared, Bluetooth™, and the like. Optional haptic interface 270 is arranged to provide tactile feedback to a user of the client device. For example, the haptic interface may be employed to vibrate client device 200 in a particular way when another user of a client device is calling.

Optional GPS transceiver 274 can determine the physical coordinates of client device 200 on the surface of the Earth, which typically outputs a location as latitude and longitude values. GPS transceiver 274 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS), or the like, to further determine the physical location of client device 200 on the surface of the Earth. It is understood that under different conditions, GPS transceiver 274 can determine a physical location within millimeters for client device 200; and in other cases, the determined physical location may be less precise, such as within a meter or significantly greater distances.

Example Network Device

Figure 3:
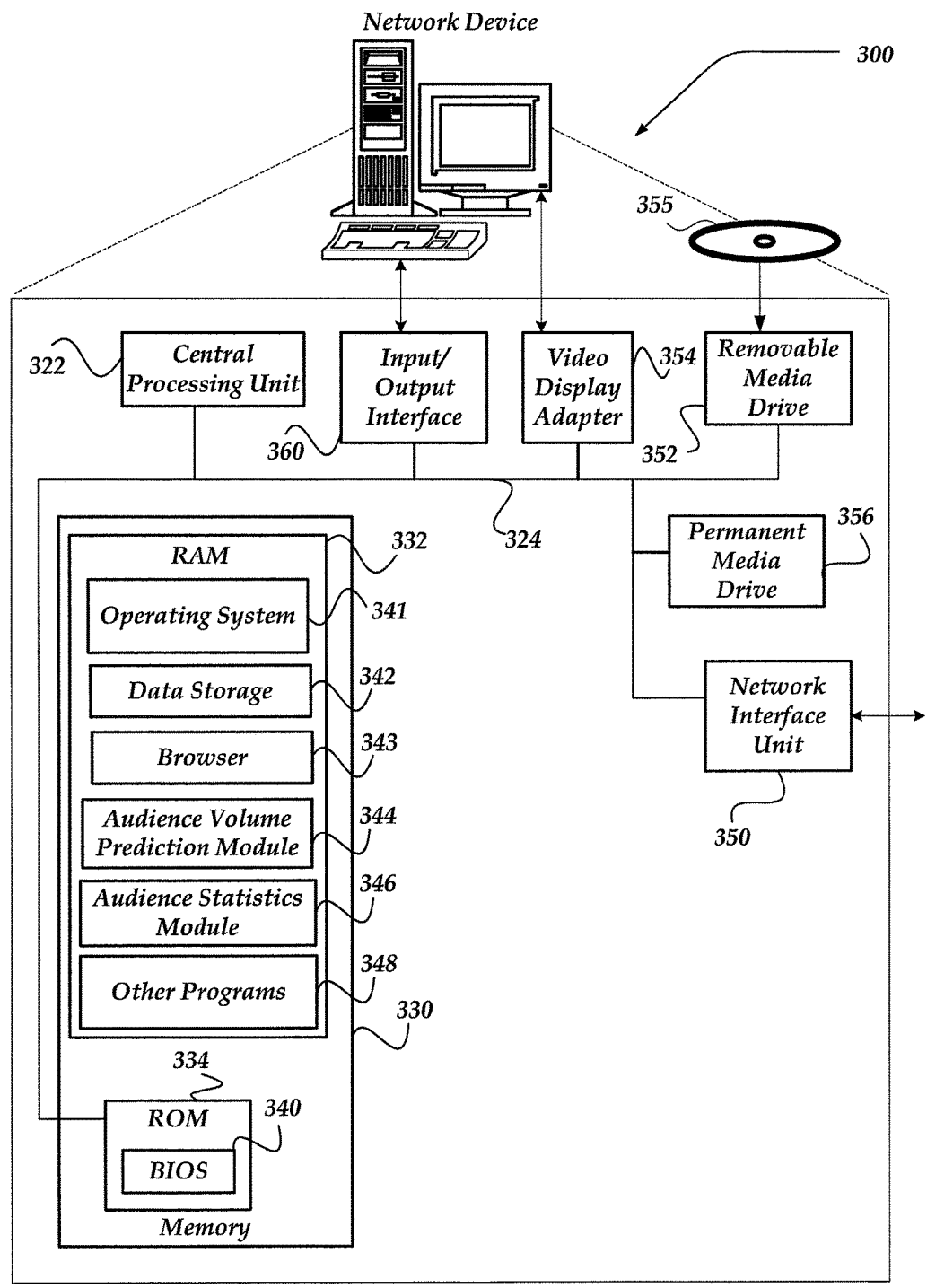
FIG. 3 illustrates an example of a network device that may be included in a system implementing embodiments of the invention.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, audience volume prediction server(s) 106, audience statistics server(s) 108, client devices (e.g. desktop personal computers) such as client device 102, content server 116, and/or data buyer 118 of FIG. 1.

As shown in FIG. 3, network device 300 includes a CPU 322 in communication with a mass memory 330 via a bus 324. Mass memory 330 may include RAM 332, a ROM 334, and other storage means. Mass memory 330 illustrates an example of computer storage media for storage of information such as computer readable instructions, data structures, program modules or other data. Mass memory stores a basic input/output system ("BIOS") 340 for controlling low-level operation of network device 300. The mass memory also stores an operating system 341 for controlling the operation of network device 300. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 330 further includes one or more data storage units 342, which can be utilized by network device 300 to store programs, applications, software modules, and the like, as well as the data used by such programs, applications, and/or software modules. Programs may comprise computer executable instructions which can be executed by network device 300. Programs in mass memory 330 may include a browser application 343. Browser 343 may run under the control of operating system 341 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 330 may also include an audience volume prediction module 344 that enables audience volume prediction functionality of the claimed invention, provided by audience volume prediction server(s) 106, described further herein. In some embodiments, mass memory 330 may also include an audience statistics module 346 that enables audience statistics functionality provided by audience statistics server(s) 108. Mass memory 330 may also include other applications 348. Other examples of application programs include content management applications, messaging applications, schedulers, calendars, web services, transcoders, database programs, word processing programs, spreadsheet programs, and so forth. Accordingly, programs may process images, audio, video, or markup pages, enable telecommunication with another user of another electronic device, and/or other services.

Server device 300 also includes an input/output interface 360 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 341, and/or programs in memory 330. Interaction with the user interface includes visual interaction via a display, and a video display adapter 354.

Server device 300 may include a removable media drive 352 and/or a permanent media drive 354 for computer-readable storage media. Removable media drive 352 can comprise one or more of an optical disc drive, a floppy disk drive, tape drive, and/or any other type of removable media drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other media which can be used to store the desired information and which can be accessed by a computing device.

Removable media drive 352 and/or permanent media drive 356 may also include processor readable storage media. Processor readable storage media may include volatile, nonvolatile, removable, and non-removable media implemented in any method or technology for storage of information, such as computer- or processor-readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device. Processor readable storage media may also be referred to herein as computer readable storage media.

Via a network communication interface unit 350, server device 300 can communicate with a wide area network such as the Internet, a local area network, a wired telephone network, a cellular telephone network, or some other communications network, such as networks 120 and/or 130 in FIG. 1. Network communication interface unit 350 is sometimes known as a transceiver, transceiving device, network interface card (NIC), and the like.

Example Operations

Figure 4:
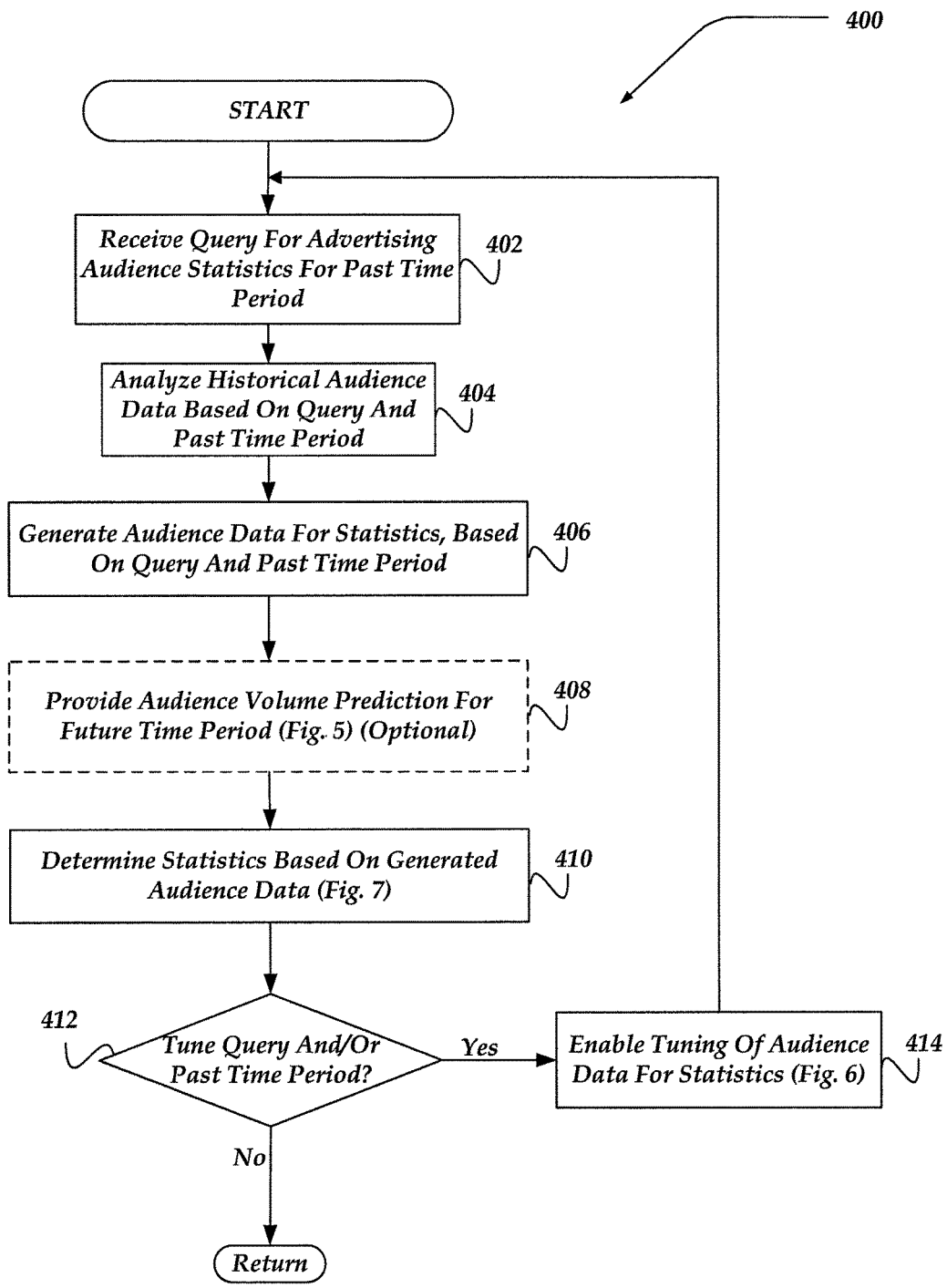
FIG. 4 illustrates a logical flow diagram generally showing an embodiment of a process for tuning a predicted audience volume and for extracting statistical correlations between the specified audience and underlying behaviors.

FIG. 4 illustrates a logical flow diagram generally showing an embodiment of a process 400 for real time determination of statistics for a specified audience. In some embodiments, this process may be implemented by and/or executed on a network device such as audience statistics server(s) 108 of FIG. 1, via an application such as audience statistics module 346 of FIG. 3.

After a start block, a query for advertising audience statistics is received at block 402. Such a query defines a particular audience to be used to determine statistics (e.g. correlations or other types of statistics). In some embodiments, the query may be specified or otherwise provided by the user. However, the invention is not so limited, and the query may also be provided by an operator, administrator or other person controlling audience volume prediction server(s). In some embodiments, the query may include one or more categories of consumer data along with one or more Boolean operators. The specified categories of consumer data may be of various category types, including but not limited to market categories, demographic categories, location categories, season categories, and the like. For example, the user may specify a query of "location=California AND market=SUV purchaser" to query for consumer data on purchasers of SUVs who live in California. As another example, the user may specify a query of "location=California OR Oregon AND market=video game console" to query for consumer data on purchasers of (or individuals who evinced an interest in) video game consoles who live in California or Oregon. On receiving the user specified query, the query may be stored in mass memory.

The query received at block 402 may be received as part of a request for a real time statistical analysis of the specified advertising audience. Such a request may, in some embodiments, be received from a user. In some embodiments, the request may be received from an administrator, operator, or other person in control of audience volume prediction server(s). In some embodiments the request may also include the past time period specifying the amount of historical data that should be used to determine the statistic(s). In some embodiments, where the request does not include a past time period, a default past time period (e.g. the last one month from the current date) may be employed. In some embodiments, such a past time period may be specified as a recency (e.g., the last week, the last month, the last year, and the like). In some embodiments, the past time period may be specified as a range of dates (e.g. Jan. 1, 2010 through Jun. 30, 2010). In some embodiments, the time period of historical data may be set as a parameter by an operator, administrator and/or manager for process 400. In some embodiments, the time period of historical data may be received from and/or specified by a user of process 400 (e.g. a data buyer requesting statistic(s) for a specified audience).

In some embodiments, the request may include an advertising audience (e.g. specified through a particular query), a past time period of historical data to use in the analysis, and/or one or more statistics to be determined based on the audience, as well as other parameters, constraints, and the like. In this way, the process may be considered an on-demand process whereby the user may specify virtually any aspect of the request for audience data and statistics.

At block 404, historical audience data may be analyzed based on the query and/or the past time period. In some embodiments, analysis may include evaluating the query for the past time period over historical audience volume data stored in a database or other data store, such as data storage 110 and/or data stored in mass memory of audience volume prediction server(s) 106 of FIG. 1. In some embodiments, the historical audience data retrieved may be based on the past time period of historical data determined at block 404. Moreover, in some embodiments, the historical audience data retrieved may include a plurality of historical advertising audience volumes.

At block 406, audience data for statistics may be generated based on the query and/or the past time period. The generated audience data may include a set of data that results from the analysis of block 404. For example, the generated audience data may include a data set that is produced by executing the specified query over the historical audience data for the specified past time period).

Optionally at block 408, an audience volume prediction (e.g. projection) for a future time period may be provided based on an analysis of the retrieved audience data. In some embodiments, the future time period may be determined based on the past time period of historical data. For example, if the past time period of historical data is six months (e.g. the last six months from the current time, or a specified range of dates that is six months long), then the future time period may also be six months. In some embodiments, the future time period may be related to the past time period by a scale factor. For example, the future time period may be specified as 1.5 times the past time period. In some embodiments, the audience volume prediction is provided to the user as a number of persons (e.g. web users, consumers, potential consumers, and the like) that will be reached by an advertising campaign targeting persons according to the user specified query. Such an audience volume prediction may be specified as an exact number or as an approximate estimate of a number of persons. In some embodiments, the audience volume prediction may be provided as an estimated range of the number of persons in the predicted audience volume (e.g. from 10,000 to 20,000 persons).

In some embodiments, generating the real time prediction for the future time period may be based on an evaluation of the query over the audience data generated at block 406. Such evaluation may include applying the query to the historical audience data to generate a subset of the data that corresponds to the query. In some embodiments, generating the real time prediction may include further analysis of the historical audience data.

Figure 5:
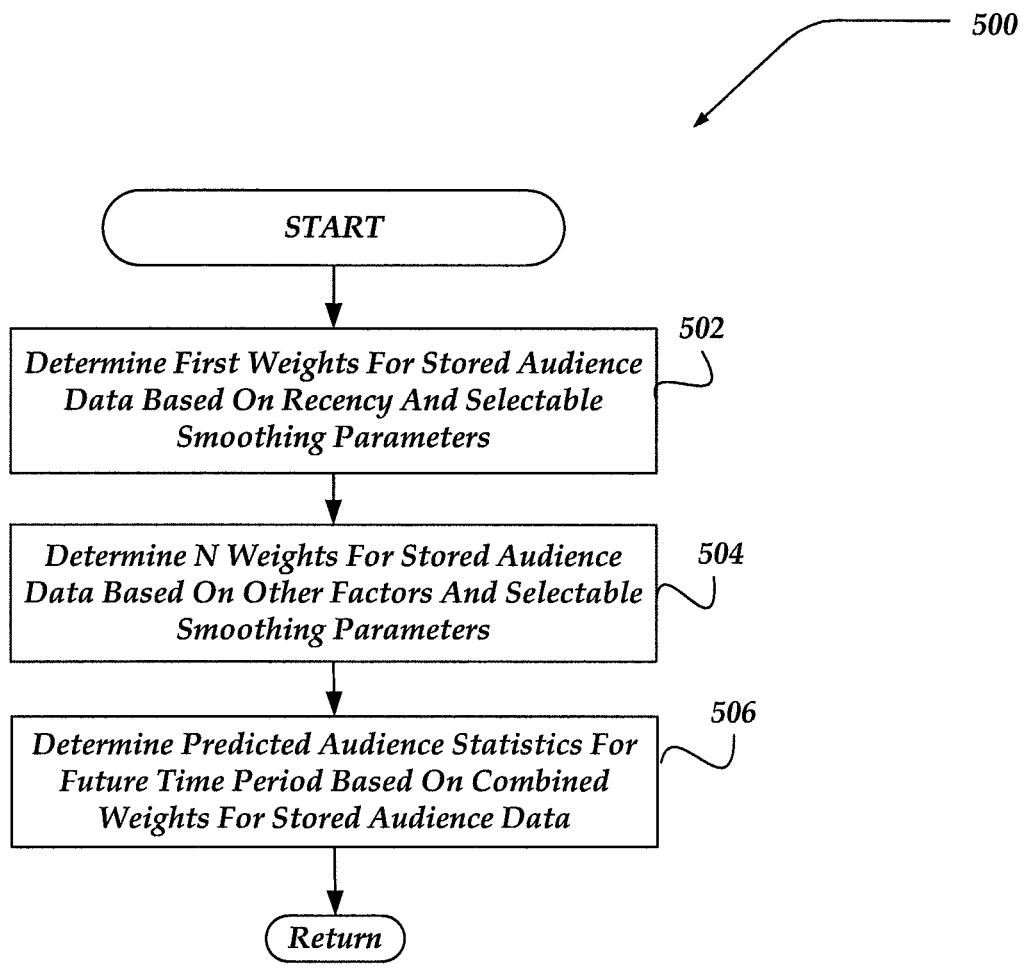
FIG. 5 illustrates a logical flow diagram showing an embodiment of a process for providing an audience volume prediction.

FIG. 5 provides an example of the analysis that may be performed to determine the audience volume prediction. After a start block, process 500 may proceed to block 502 where one or more first weights may be determined for the stored audience data based on recency and on a selectable scaled smoothing. In some embodiments, the first weights may be weighting factors that determine the weights given to the various data when calculating the predicted audience volume. In some embodiments, more recent data may be weighted for heavily than older data. For example, data collected in the last month may be weighted more heavily than data collected in the previous month, and so forth, as in the following table.

| Time period for collected data | Weighting factor (w) |
|---|---|
| One month ago until current time | w = 1.0 |
| Two months ago until one month ago | w = 0.8 |
| Three months ago until two months ago | w = 0.6 |
| Four months ago until three months ago | w = 0.4 |
| Five months ago until four months ago | w = 0.2 |

In this example, historical data is retrieved up until five months from the current time. In some embodiments, weighting based on recency may be considered a recency-based averaging of the historical data, and may function as a smoothing to account for more-or-less extreme changes in the rate of collection of historical data.

At block 504, a further N number of weights may be determined for the stored audience data based on other factors and on a selectable scaled smoothing. Such other factors may include but are not limited to: day of the week (e.g. data collected Saturday and Sunday is weighted different than data collected on weekdays), seasonality (e.g. data collected in the winter is weighted differently than data collected in the summer), special events (e.g. weighting related to holidays, natural disasters, entertainment events, and the like), and/or geographical factors (e.g. different weights for southern U.S. vs. eastern U.S.). In some embodiments, weighting may also be based on the source of the particular consumer data collected. For example, data collected from web site X may be weighted differently than data collected from web site Y.

At block 506, the predicted audience volume may be determined for the future time period based on combined weights for the stored audience data. In some embodiments, this determination may be performed through a calculation according to a particular algorithm. For example, predicted audience volume (PAV) may be calculated through a linear sum of weighted data:

$$PAV=p(1)*w(1)+p(2)*w(2)+p(3)*w(3)+ \ldots p(n)*w(n)$$

where p(i) represents the historical data being analyzed and w(i) represents one or more weight factors applied to the particular data.

Although this example shows a linear sum, other algorithms may be contemplated without departing from the spirit or scope of the invention. For example, a quadratic algorithm or other polynomial expansion may be employed, and/or exponential, logarithmic, or virtually any other type of mathematical algorithm.

In some embodiments, the weights applied for recency and/or other factors may be non-uniform (e.g. different weights applied to different factors) and may be selectable by the user and/or by an implementer, operator and/or administrator of the audience volume prediction server.

Figure 8:
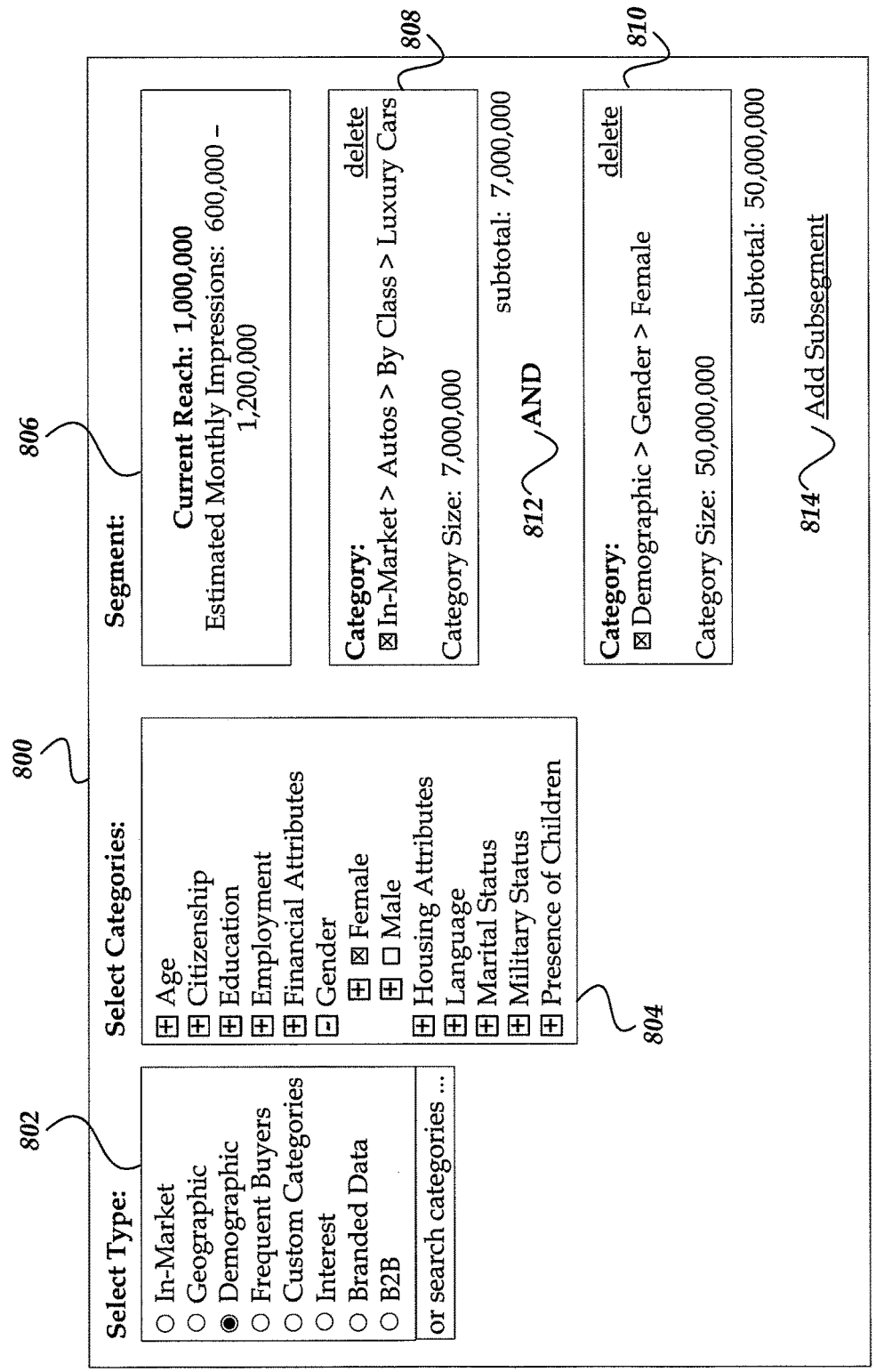
FIG. 8 illustrates an example user interface for audience volume prediction.

After the predicted audience volume has been determined, it may be provided to the user via a report screen or other means (described in more detail with regard to FIG. 8). In some embodiments, the predicted audience volume may be provided to the user as a number of persons that are predicted to be reached by the specified query for the determined future time period, and/or a range of an estimated number of persons predicted to be reached. In some embodiments, retrospective (e.g. historical) information may further be provided to the user. For example, the user may be provided with data specifying that a campaign according to the user specified query would have reached X persons had it been run during the past time period. Following block 506, process 500 may return.

Returning to FIG. 4, at block 410 one or more statistics may be determined based on the generated audience data. In some embodiments, statistics may include correlations and/or other types of statistics requested by the user for the audience data. This determination of correlations is described in more detail with regard to FIG. 7. In some embodiments, the determination of one or more statistics may be performed by a network device such as one or more of audience statistics server(s) 108 shown in FIG. 1, and/or through audience statistics module 346 of FIG. 3.

After a start block, process 700 proceeds to decision block 702 where a determination is made that the user requested a correlation as the particular type of statistic to be determined. If so, then the process may proceed to option block 704 where, in some embodiments, a particular correlation metric may be received. In some embodiments, the user may be enabled to specify a particular correlation metric for use in determining the correlations. For example, the user may be presented with a dialog in which various correlation metrics (e.g. methods, algorithms, and the like) are presented for selection. Correlation metrics presented may include a chi-square correlation metric, Pearson metric, Spearman metric, as well as virtually any other correlation metric. In some embodiments, the correlation metric may be described to the user in a more friendly description instead of in mathematical terms. For example, the user could be presented with correlation method choices of "Tight", "Loose" or "Medium", or other description, where each choice may correspond to a different mathematical correlation metric. In some embodiments, the user may not be presented with a choice of correlation metrics, and the correlation metric may be hard-coded, predetermined or selected by an operator, controller, and/or administrator of the audience statistics server.

At block 706, one or more correlations are calculated or otherwise determined. Correlations may be determined between the audience data and one or more external behaviors of audience data member(s), using the correlation metric specified at block 704. In some embodiments, the advertising data may include the audience that is generated based on the query and through the analysis of the stored historical data as described with regard to blocks 404 and 406 of FIG. 4. For example, an audience determined through the specified query of "location=California AND age=20 to 40 AND gender=male" may include 10,000 persons. Of those 10,000 persons, 1,000 may also be associated with a market-interest category for BrandX shoes. Thus, a category of BrandX shoes may be a correlation determined for the specified audience. Further, of those 10,000, 500 may also be associated with a category for location=San Diego, and location category San Diego may be another correlation determined for the audience data. In this way, a correlation may indicate an external behavior of members within the audience data.

In some embodiments, determination of a correlation may be based on a determination that a certain correlative factor is above a predetermined threshold result for the correlation algorithm. In some embodiments, determination of a correlation may be based on a determination that the correlation is above a threshold for a certain percentage of the specified audience. For example, a correlation may be found if the correlative category (e.g. BrandX shoes in the above example) is associated with a population greater than or equal to 10% of the audience volume correlation data.

The determined correlations may be described by one or more categories and/or combinations of categories that indicate one or more behaviors of members of the audience data. In some embodiments, the behaviors may be external behaviors (i.e. behaviors that are outwardly manifested in some way by one or more members of the audience data). Such external behaviors may be explicitly correlated with the members. For example, a finding that an audience includes a high number of members who purchased sports car may lead to a determination of a correlation with an explicit external behavior of purchasing a sports car. However, the invention is not so limited, and external behaviors may also be implicitly correlated with members of the audience data. For example, a finding that an audience includes a high number of members who purchased fishing gear may lead to a determination of a correlation with an implicit external behavior of fishing, or an interest in fishing. That is, the purchase of fishing gear may imply an interest in fishing even though the explicitly measured behavior is purchasing fishing gear.

The following non-limiting example illustrates operation of embodiments of the invention to determine audience correlations. In this example, a user (e.g. a data buyer) is interested finding audiences (e.g. populations) that are correlated to a specified audience "women between the ages of 30 and 50 in market for luxury cars". So the user may enter a query such as the following:

Gender=female AND age=30 to 50 AND market=luxury car

The user may then request analysis using both Pearson and Spearman correlation statistics, and based on the past 60 days of online and offline data (e.g. behavioral data, demographic data, geographic data, and the like). Embodiments may then perform the necessary statistical analysis of historical data, and provide to the user in real time a list of other audiences that are correlated to the specified audience. Such correlated audience may be presented to the user in a certain order based on a degree of correlation (e.g. in an order from more highly correlated to less highly correlated). For example, the analysis may output the following table of correlated audiences:

| Correlated Audience | Correlation Level |
|---|---|
| Market = jewelry | +0.9 |
| Market = air travel to exotic destinations AND Visitation = site X | +0.6 |
| Interest = book club AND Location = New Jersey AND Interest = tennis | +0.3 |
| Interest = cricket | −0.5 |

In this example, three separate correlated audiences have been identified: "people in market for jewelry", "international flyers to exotic destinations who frequently visit travel site X", "members of book clubs, living in New Jersey, who are interested in tennis". These three correlated audiences are provided in an order determined by their correlation level (e.g. correlation score). In some embodiments, correlation level may vary from −1.0 to +1.0, with +1.0 indicating the highest level of correlation (e.g. complete correlation) and −1.0 indicating the lowest level of correlation (e.g. no correlation at all). However, the invention is not so limited, and correlation level may be indicated by virtually any numerical scale or set of values, descriptive text, color coding, and the like.

As shown in the table, correlated audiences may be described by a single category (e.g. market=jewelry) and/or by a combination of multiple categories (e.g. a Boolean combination such as Market=air travel to exotic destinations AND Visitation=site X).

In some embodiments, some or all possible categories, subcategories and/or combinations of categories and subcategories of data may be analyzed to determine the correlation between the specified audience and any of the categories and/or subcategories supported by the system. In such cases, and complete list of all possible correlations may be presented to the user.

In some embodiments, the user may request to be presented with those correlated audiences with a correlation level above a certain threshold. For example, if correlation level varies from −1.0 to +1.0, the user may request a list of correlated audiences with correlation level about 0.0 (e.g. those correlated audiences with a positive correlation level). In some embodiments, the user may request that he/she be presented with those correlated audiences in a certain set of one or more categories and/or subcategories. For example, the user may request to see correlated audiences of the demographic type categories. As another example, the user may request to see correlated audiences for one or more particular categories such as market=luxury cars. Thus, embodiments of the invention may enable the user to request a specific and/or customized list of correlation types for the specified audience. In this way, the user may be enabled to filter the results based on correlation level, categories, and/or other parameters.

After block 706, process 700 proceeds to decision block 708. Also, process 700 proceeds to decision block 708 if decision block 702 determines that correlation-type statistics were not requested by the user. At decision block 708, a determination is made whether other types of statistics have been requested. If so, process 700 proceeds to block 710 where other statistic type(s) are determined based on the audience data.

As an example of another type of statistical analysis, in some embodiments an audience may be determined based on a specified query, and the user may request a statistical analysis of the number of categories of data for persons in the determined audience. In that case, the user may be provided with an average number of categories for persons in the determined audience and/or a variance (e.g. a width of the distribution of number of categories for persons in the determined audience). For example, a query of "Visitation=site X" may result in a determined audience of 10,000 persons who on average are each associated with 10 categories, and/or with a variance of 2.5. Embodiments may also support more complicated analysis of number of categories.

For example, it may be determined that the distribution of number of categories for members of a determined audience is bimodal, trimodal or generally n-modal, such that the distribution has multiple identifiable concentrations. This may be the case in instances, for example, where a number of bots, spiders or other types of automated processes are crawling web sites. Such automated processes may crawl different sites that are more random in subject matter than real persons who may focus their attention on certain types of sites. Thus, the "persons" in a determined audience who are affiliated with automated processes (e.g. bots) may be associated with a much larger number of categories than real persons, creating a bimodal distribution with one concentration for real persons and another concentration for automated processes.

Some embodiments may enable statistics such as average number of categories and/or variance in number of categories to be included by a user in the query. For example, a user may specify a query of location=Missouri AND interest=tennis AND number of categories <10 to obtain an audience of persons who have a more narrowly focused interest in tennis.

As another example of a type of statistical analysis, in some embodiments a determined audience may be analyzed to determine one or more clusters of persons around certain categories. For example, an audience may be determined based on a query for location=Atlanta. And analysis may determine that this audience contains clusters of persons concentrated around categories market=running shoes, age=20 to 30, interest=tennis, and the like. Such clusters may be provided to the user as a result of the analysis. In some embodiments, a user may be enabled to select one or more of the clusters for further analysis, e.g. to determine further correlations within the audience for the selected cluster.

Such other types of statistics as described herein are exemplary and non-limiting. Virtually any type of statistical analysis may be supported by embodiments, without departing from the spirit or scope of the invention.

Following block 710, or if decision block 708 determined that other statistic types are not requested, process 700 proceeds to decision block 712. At decision block 712, a determination is made whether additional statistics have been requested for the audience data. If so, process 700 returns to decision block 702. If not, the determined statistics are provided to the user at block 714. In some embodiments, details regarding the extracted correlations may be provided to the user via a report screen or other means, including but not limited to email, text message, generated report document (printed or electronic), and the like. Process 700 then returns.

Returning to FIG. 4, at decision block 412 a determination is made whether the query and/or past time period is to be tuned. In some embodiments, this determination may be based on an indication from the user (i.e. a request for tuning of query and/or past time period). If so, at block 414 the user may be enabled to tune the audience data by modifying the query and/or the past time period.

In some embodiments, a user may be enabled to tune the audience data based on insights gained by the user from the previous audience data and/or statistics that are determined based on the audience data. For example, audience data resulting from a first query of "gender=male AND location=city of Atlanta" may include fewer persons over the age of 60 than the user would like. In that example, the user may tune the query and broaden it somewhat to "gender=male AND location=(city of Atlanta OR suburban Atlanta)", to seek a higher correlation between the specified query and the category age >60.

Figure 6:
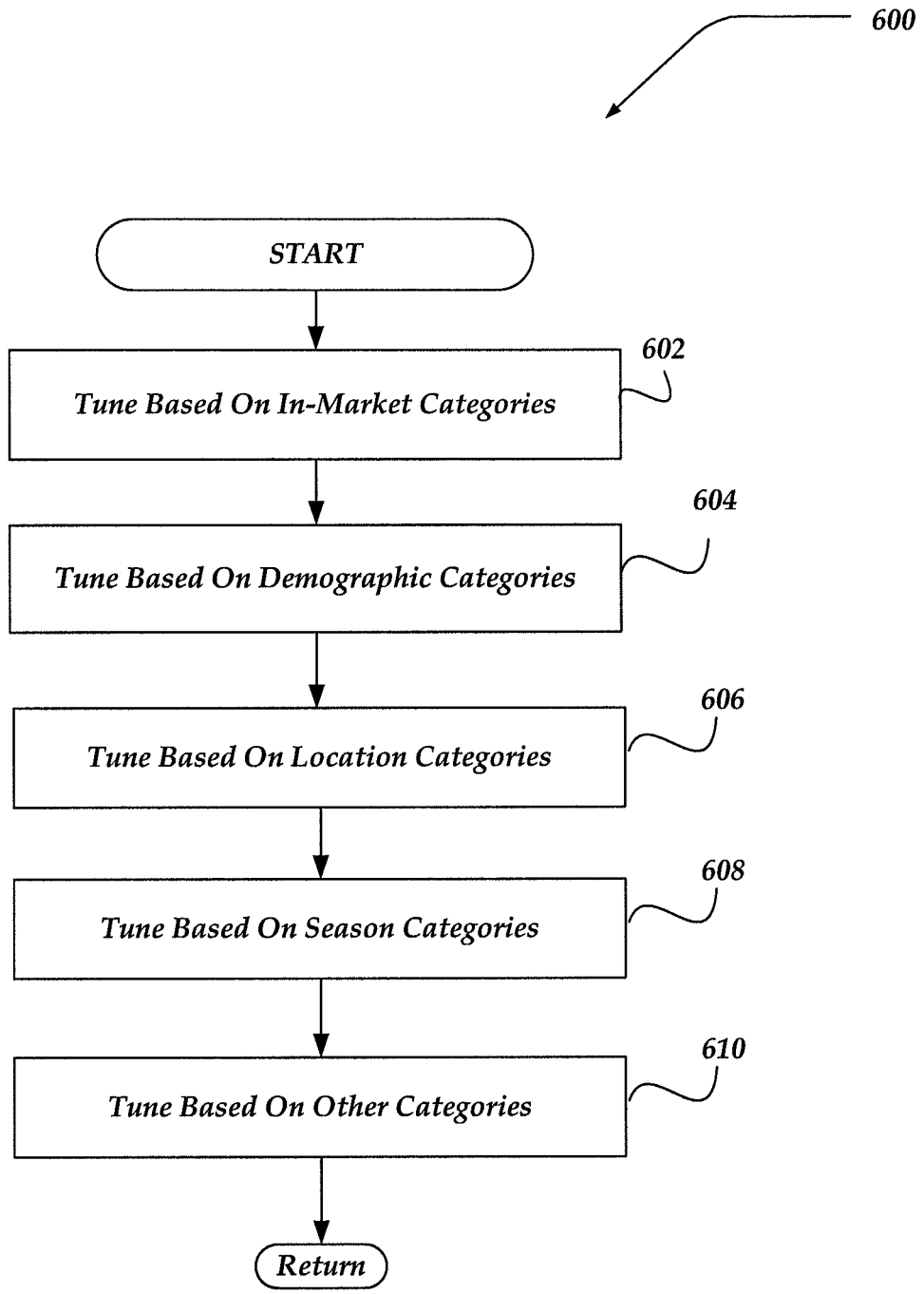
FIG. 6 illustrates a logical flow diagram showing an embodiment of a process for tuning of a user-specified query for audience volume prediction.
Figure 7:
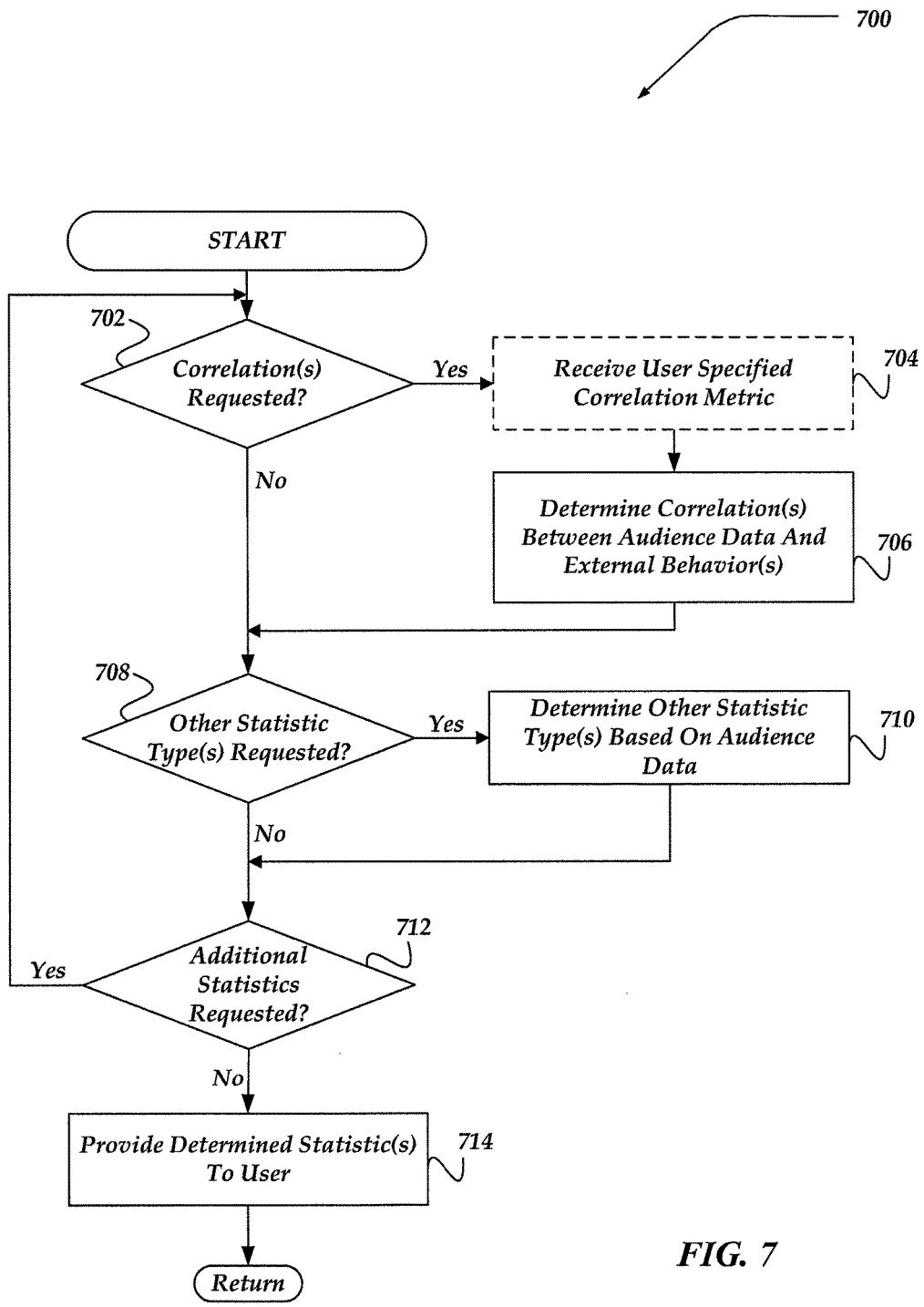
FIG. 7 illustrates a logical flow diagram showing an embodiment of a process for determining and providing statistical correlations.

FIG. 6 provides a more detailed example of tuning of the query for audience volume prediction. After a start block process 600 proceeds to block 602, where a determination is made to tune based on one or more in-market (e.g. market) type categories in the user-specified query. For example, market type categories may categories for a consumer's purchase of and/or interest in goods and services related to travel, finance, retail purchases, automotive purchases, and virtually any other type of good or service. At block 602, the user may edit the query to change, add or remove in-market categories.

At block 604, a determination is made to tune based on one or more demographic type categories. Demographic type categories generally include categories associated with virtually demographic factor, including for example age and/or gender. At block 604, the user may edit the query to change, add or remove demographic categories.

At block 606, a determination is made to tune based on one or more location type categories. Location type categories generally include categories associated with geographic locations (e.g. continent, country, state, province, prefecture, county, city, neighborhood, address, and the like). At block 606, the user may edit the query to change, add or remove location categories.

At block 608, a determination is made to tune based on one or more seasonal type categories (e.g. seasons of the year). Season type categories may also include particular holiday seasons (e.g. a predetermined period of time prior to a holiday such as Christmas). Season type categories may also generally include categories related to particular time periods (e.g. months, weeks, days of the year, particular days of the week, and the like). At block 608, the user may edit the query to change, add or remove season type categories.

At block 610, a determination is made to tune based on other types of categories. In addition to editing the particular categories included in a query, the user may be enabled to change the Boolean operators used to combine the categories to form the query. For example, a user specified query of "location=California AND gender=male" may be tuned to "location=California OR gender=male". After block 610, process 600 may return.

Following the user's tuning of the query, process 400 may then return to 402 and repeat the process. In this way, process 400 may execute over one or more iterations during which the user specifies a query and correlation(s) are determined based on the query and the past time period. Such iterations may continue until the user is satisfied with the correlations, until a predetermined number of iterations have been executed, or until some other termination criterion or set of criteria is satisfied. At decision block 412, if the predicted audience volume is not to be tuned, process 400 may return.

In some embodiments, tuning of the audience data by the user may enable the user to select for a particular correlation that is determined within the audience data. For example, if a correlation for BrandX shoes is determined (as in the example above), the user may tune the query and/or past time period to maximize or minimize the correlation for BrandX shoes.

In some embodiments, the audience correlation functionality and/or other statistical analysis is provided in real-time, such that the user is provided with results within a certain period of time following specification of the query. In some embodiments, such period of time may be brief (e.g. more or less in real time from the perspective of the user). In some embodiments, the real-time provision of the audience volume calculations, correlations and/or other statistical analysis may include parallel processing of the retrieval of historical data and/or analysis of historical data by multiple servers in a cluster of audience statistics servers. In some embodiments, a level of service and/or quality of service may be used to determine a number of servers to be used for parallel processing of historical data and/or to perform the real time determination of audience statistics. Such level of service and/or quality of service may be specified by the user and/or by an administrator, operator, controller, or the like. For example, if a user specifies a level of service that is a one second response time to a query, a certain number of servers may be allocated to process that request to achieve that level of service. Some speed up techniques may be determined by an implementer, operator, and/or administrator of the claimed invention to achieve a predetermined level of service and/or satisfy the real time quality of service requirements of the user.

In some embodiments, real time results may be achieved through memory management techniques employed on the one or more audience statistics servers and/or data storage. For example, infrequently accessed historical data may be stored on hard disk with slower access, and more frequently accessed historical data may be stored in memory with faster access. In this way, speed-up of processing may be achieved at lower cost (e.g. a certain result achieved using 1000 servers holding data in memory may be achieved with a substantially similar level of service using 10 servers storing at least a portion of the needed data on hard disk).

In some embodiments, real time results for audience calculation and/or audience statistics determination may be achieved through techniques that speed up the processing at the data retrieval and/or analysis phases of the process. For example, retrieval of historical data may include a sampling of the historical data instead of retrieval of a full data set. Further, analysis of the historical data to determination statistics may include analysis of a sample (e.g. subset) of the retrieved historical data. In some embodiments, sampling may be performed to meet a user-specified level of server and/or quality of service. For example, to meet a level of service that is a one second response time, it may be necessary to retrieve and/or analyze 50% of the historical audience data.

In this way, level of service (e.g. response time), quality of service (e.g. accuracy and/or confidence level of result), and/or cost (e.g. number of servers or other resources employed) may be weighed and/or balanced against one another to ensure an appropriate level of service to the user. For example, a faster response time may require increased sampling of the historical data set, which may in turn lead to a lower confidence level of the result. In such circumstances, if both a fast response time and a high confidence level are required, additional servers may be employed to ensure a fast response time with a high confidence level. The cost of additional servers may be passed on to the user in the form of higher service fees and the like.

FIG. 8 illustrates an example user interface for audience volume prediction and/or calculation. Such a user interface may provide functionality that allows a user to specify a query for audience volume prediction, and provide in real-time an audience volume prediction for a future time period based on that query as well as historical audience volume for the specified query. In some embodiments, such a user interface may be provided to a user who is using data buyer server 118 and/or one or more of client devices 102-104 shown in FIG. 1. In some embodiments, such a user interface may be implemented through a set of APIs that are provided to the user from a server device such as audience volume prediction server(s) 106 shown in FIG. 1.

As shown in FIG. 8, user interface 800 includes various controls, dialogs, and other user interface elements to enable a user to specify a query for audience volume prediction. These may include a "Select Type" control 802 that enables a user to select one or more types of categories to include in the user-specified query. Such types of categories may include, but are not limited to, In-Market, Geographic, Demographic, Frequent Buyers, Custom Categories, Interest, Branded Data, Business-to-business (B2B), and the like. Selection of a category type through control 802 may include selection of a radio button or other control-type. In the example shown, the user has selected the Demographic category type. In some embodiments, control 802 may also include a dialog or other control to enable the user to search for categories and/or category types.

User interface 800 may further include a "Select Categories" control 804. In some embodiments, control 804 may present a list of categories based on the user selection of category type through control 802. In the example shown, the user has selected the Demographic category type through control 802, and control 804 has been populated with a list of categories that correspond to the Demographic category type (e.g., categories for Age, Citizenship, Education, Employment, and the like). The user may then select one or more categories from this list to be included in the query. In some embodiments, categories may be presented in a hierarchical structure as a listing of categories, sub-categories, sub-sub-categories, and so forth. Such a hierarchy of categories may be presented to the user in a tree structure or the like. For example, as shown in the figure, the user has expanded the Gender category (e.g. through use of a +/−expand/collapse tree control) to expose two sub-categories of Gender=Male and Female. The user has further selected the Female sub-category for inclusion in the query.

User interface 800 may also include elements that display the user-specified query as the user adds, removes and/or otherwise modifies the query. For example, elements 808 and 810 may depict two exemplary categories that the user has selected to be included in the query, through use the controls 802 and 804. Element 808 shows that the user has selected a first category of "Luxury Cars", specified in its hierarchical form as category type "In-Market" combined with category "Autos>By Class>Luxury Cars". Element 810 shows that the user has further selected a second category of "Female", specified in its hierarchical form as category type "Demographic" combined with category "Gender>Female". In some embodiments, user interface 800 may also present a category size for selected categories. Such category size may be based on an analysis of historical data, for example a determination that the specified category would have reached an audience volume of a certain number during a specified past time period (e.g. the last month). For example, element 808 includes a determined Category Size of 7,000,000 and element 810 includes a determined category size of 50,000,000. User interface 800 may further include a control 812 to allow a user to specify a logical Boolean operator as part of the specified query. For example, FIG. 8 depicts control 812 as set to "AND" by the user, to specify that the query should be a first category AND a second category. Elements 808 and 810 may further include "delete" controls as shown, to enable the user to delete a particular category from the query.

User interface 800 may also include a control 814 to enable the user to add one or more additional categories (e.g. subsegments) to the query. Addition of further categories to the query may cause the user interface to display the additionally specified categories in additional categories elements such as elements 808 and 810. In the way, the user is able to specify a custom query composed of categories and/or subcategories, combined using logical operators.

Once the user has specified the query, element 806 may display a current reach for the specified query. In some embodiments, this current reach may be a historical audience volume corresponding to the user-specified query, provided as a retrospective analysis to the user. For example, as shown in FIG. 8, element 806 shows a current reach of 1,000,000 audience volume, indicating that a campaign using the user-specified query would have reached an audience volume of 1,000,000 if it had been run during a past time period (e.g. the last month).

Element 806 may further display "Estimated Impressions" based on an audience volume prediction for a future time period. The predicted audience volume may be provided to the user as a number of persons that are predicted to be reached by a campaign that uses the specified query for a determined future time period, and/or a range of an estimated number of persons predicted to be reached. Such a prediction may be based on an analysis of stored historical data, as described herein with regard to FIG. 4. For example, as shown in FIG. 8, element 806 includes "Estimated Monthly Impressions" as a range of 600,000 to 1,200,000, indicating that a campaign using the user-specified query is estimated to reach a predicted audience volume within this range if run during a certain future time period. In some embodiments, the "Current Reach" and "Estimated Impressions" number may be provided and/or updated to the user in real-time as the user specifies and/or modifies the query respectively, such that the user may more or less immediately see the predicted audience volume and/or retrospective audience volume that would be reached by a campaign using the query.

It should be noted that user interface 800 is an example user interface that may be employed in embodiments of the invention. Generally, such a user interface may include more or fewer elements that those depicted, without departing from the spirit or scope of the invention. Though not shown in FIG. 8, the user interface may include controls, displays and the like to present to the user information regarding one or more audience correlations determined based on historical data for a specified audience as described herein.

Figure 9:
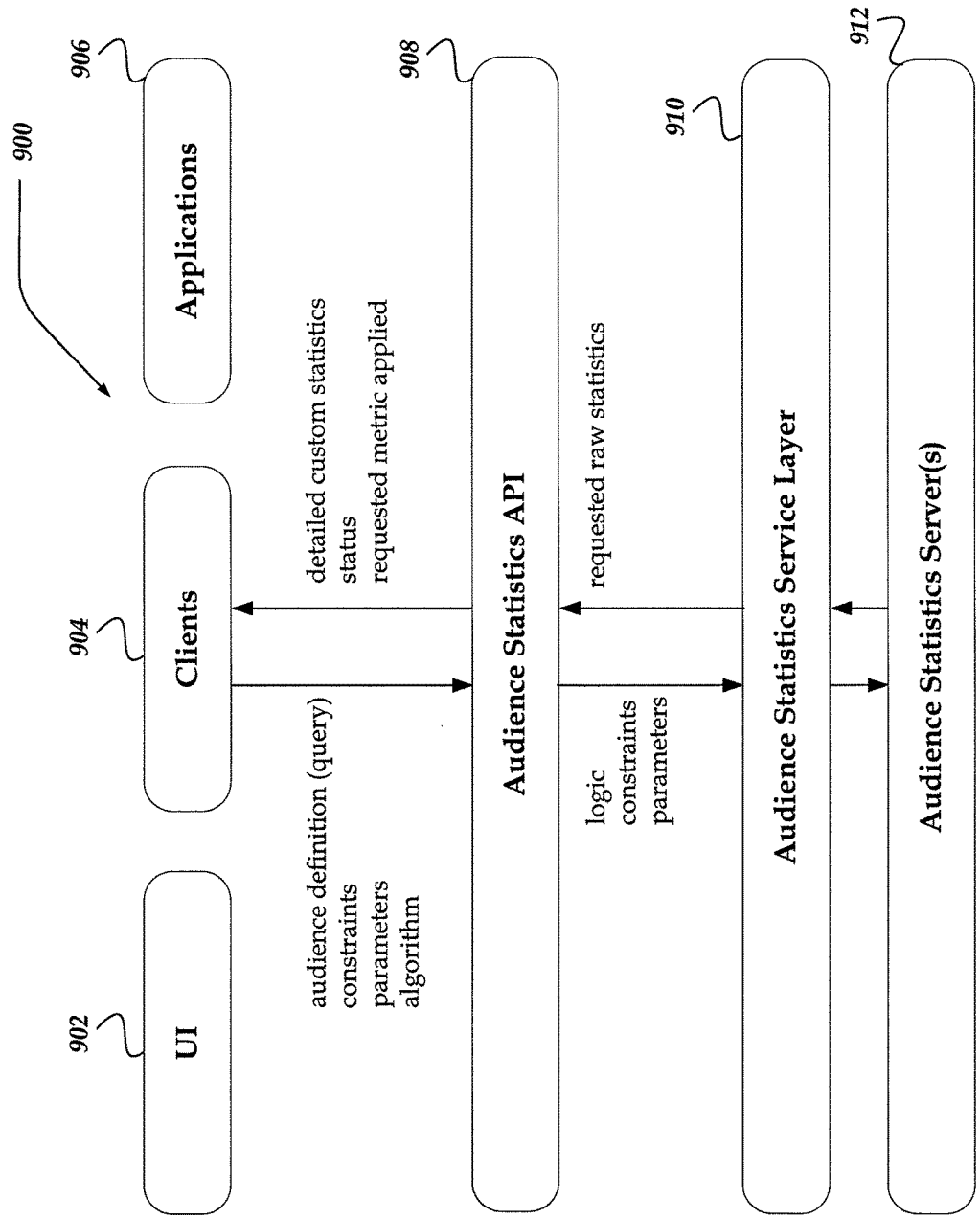
FIG. 9 illustrates an example control flow for an exemplary application program interface (API) included in embodiments.

As discussed herein, functionality of the audience volume prediction server(s) 106 and/or audience statistics server(s) 108 of FIG. 1 may be provided to a user through an API or set of APIs. FIG. 9 illustrates an example control flow 900 for an API and/or set of APIs included in embodiments of the invention. A user may use the API to access audience calculation and/or correlation functionality through various mechanisms, including a user interface 902 that provides access to functions of the API, one or more client(s) 904 that access functions of the API, and/or one or more application(s) 906 that incorporate functions of the API. In some embodiments, application(s) 906 may be custom applications designed and built for the data buyer using the API provided. All of these mechanisms (as well as virtually any other conceivable mechanism such as batch files, scripts, and the like) may use the API to access audience correlation functionality. For purposes of illustration of an exemplary embodiment, FIG. 9 depicts client(s) 904 interacting with the API.

In some embodiments, the API may include multiple layers of functionality provided to various parts of a system practicing the claimed invention. For example, as shown in FIG. 9, the API may include a layer 908 for Audience Statistics API. Layer 908 may interact with client(s) 904. The API may also include Audience Statistics Service Layer 910 that interacts with both layer 908 and the one or more audience statistics servers 912. In this way, layer 908 may be considered an intermediary between client(s) 904 and layer 910, and layer 910 may be considered an intermediary between layer 908 and audience correlation server(s) 912.

In some embodiments, functionality of layer 908 may operate on one or more audience statistics server(s) to make the statistics functionality of the API available to clients, applications, user interfaces and/or other jobs executing on client devices and/or data buyer server 118 of FIG. 1. In some embodiments, layer 910 executes on and/or is in communication with one or more audience statistics servers 912.

Communications between the layers may enable audience statistics functionality. For example, layer 908 may both send and receive data, operations, and/or other communications to and from layer 910, UI 902, clients 904 and/or applications 906. As shown in the figure, layer 908 may receive from clients 904 (or from UI 902 or applications 906) the audience definition (e.g. the user-specified query to determine the audience data for statistics). Layer 908 may also receive various constraints on the request, such as constraints on the categories for determined audience correlations (e.g. if the user requests determination of correlations for demographic type categories and/or particular categories), constraints on the results presented (e.g. if the user requests to be shown only correlations above a certain threshold correlation score or level), and the like. Layer 908 may also receive one or more user-specified parameters, such as parameters for a confidence interval, sampling level, amount of historical data to use (e.g. data within the last month), and/or time constraint (e.g. request result within 1 second) for determining correlations. Layer 908 may also receive information regarding the algorithm requested by the user (e.g. use Pearson, Spearman, chi-square, or other correlation metric).

Layer 908 may send to clients 904 (or UI 902 or applications 906) detailed custom statistics resulting from the user's requests, such as statistics related to the determined audience correlations and/or other statistics types. Layer 908 may further send to clients 904 information related to the status of the audience statistics server(s) (e.g. server operation normal, server is down, server response time, new data not received, using day-old data, and the like). Layer 908 may further send to clients 904 information regarding the requested metric applied during the statistical analysis (e.g. chi-square metric, Pearson metric, Spearman metric, and the like used to determine correlations).

Layer 908 may send and receive communications to and from Audience Statistics Server Layer 910. For example, layer 908 may send layer 910 information related to logic, including information related to optimization of the requested correlation job, optimization of the user-specified query, and the like. Logic may also include more detailed information corresponding to the requested correlation metric. For example, the user may specify to layer 908 that the Pearson correlation metric is to be used during the statistical analysis, and the logic sent to layer 910 from layer 908 may include a more complete mathematical formula or other description corresponding to the Pearson metric. Generally, logic may include more detailed (e.g. more directly machine-useable) instructions and/or more detailed information corresponding to the simple commands sent to the Audience Statistics API layer 908 from clients 904.

Further, layer 908 may send layer 910 information related to constraints and/or parameters (e.g. a timeout or other limitation for the requested correlation job) corresponding to the constraints received by layer 908 from clients 904. Layer 908 may receive from layer 910 raw statistics, for example audience data determined based on the specified query and past time period as discussed herein.

In some embodiments, layer 910 executes on and/or is in communication with one or more audience statistics servers 912. In some embodiments, layer 910 may perform tasks related to parallel processing of audience data calculation and/or audience statistics jobs. For example, layer 910 may act (e.g. as a load balancer) to parcel out different portions of a job to various servers to enable faster completion of the job in real time. Layer 910 may further coordinate, integrate or otherwise process the results received back from the various servers executing the portions of the job. Embodiments may also include an API or set of APIs related to audience volume prediction functionality.

It will be understood that figures, and combinations of steps in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational steps to be performed by the processor to produce a computer implemented process for implementing the actions specified in the flowchart block or blocks. These program instructions may be stored on a some type of machine readable media, such as computer readable media and/or processor readable storage media, and the like The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A processor-based method for interactively modifying a database query to produce constraint based populations from a database:
   receiving by one or more processors and over a network, from a user device, a first request for a for a result population and a constraint-overlap result, the first request including:
      a first constraint and a second constraint, wherein the first constraint and the second constraint are members of a set of constraints; and
      a first time period, wherein:
         the first time period begins prior to receiving the first request; and
         the first time period ends prior to receiving the first request;
   generating, using one or more processors, a first population from a database, wherein:
      each first record of a plurality of first records in the first population satisfies the first constraint; and
      each first record of the plurality of first records in the first population was created during the first time period;
   generating, using one or more processors, a second population from the database, wherein:
      each second record of a plurality of second records in the second population satisfies the second constraint; and
      each second record of the plurality of second records in the second population was created during the first time period;
   generating, using one or more processors, the result population from the database, wherein:
      each result record of a plurality of result records in the result population satisfies the first constraint and/or satisfies the second constraint; and
      each result record of the plurality of result records in the result population was created within the first time period;

generating, using one or more processors, a first subset of the set of constraints, wherein each constraint in the first subset includes an occurrence quantity defined based on a number of records in the first population for which the constraint is satisfied;

generating, using one or more processors, a second subset of the set of constraints, wherein each constraint in the second subset includes an occurrence quantity for the constraint that is defined based on a number of records in the second population for which the constraint is satisfied;

generating, using one or more processors, a constraint-overlap result that includes a third subset of the set of constraints, wherein the third subset includes one or more constraints, each of the one or more constraints being included in both the first subset and the second subset, wherein each constraint in the third subset is a constraint in which a sum of the occurrence quantity for the constraint in the first subset and the occurrence quantity for the constraint in the second subset exceeds a threshold, and wherein the constraint-overlap result further includes a correlation for each constraint in the third subset, the correlation representing a degree of correlation between the constraint and the result population;

transmitting by one or more processors and over the network, to the user device, the result population and the constraint-overlap result;

receiving by one or more processors and over the network, from the user device, a second request for a different population, the second request including:
a third constraint selected from the third subset of the set of constraints included in the constraint-overlap result based on the correlation; and
the first time period or a different time period.

2. The method of claim 1, wherein each result record of a plurality of result records in the result population satisfies the first constraint and satisfies the second constraint.

3. The method of claim 1, wherein each result record of a plurality of result records in the result population satisfies the first constraint or satisfies the second constraint, but does not satisfy both of the first constraint and the second constraint.

4. The method of claim 1, wherein each result record of a plurality of result records in the result population satisfies the first constraint or satisfies the second constraint.

5. The method of claim 1, wherein:
the first request further includes:
a first frequency associated with the first constraint; and
a second frequency associated with the second constraint;
generating, using one or more processors, the result population from the database, includes:
each result record of a plurality of result records in the result population satisfies the first constraint and the first frequency; and/or
each result record of a plurality of result records in the result population satisfies the second constraint and the second frequency.

6. The method of claim 5, wherein the first frequency and the second frequency are the same.

7. The method of claim 1, wherein the second request includes the first constraint and/or the second constraint.

8. The method of claim 1, wherein the first constraint or the second constraint includes at least one of an in-market type constraint, a demographic type constraint, a location type constraint, a visitation type constraint, and a season type constraint.

9. The method of claim 1, wherein:
the first request further includes a correlation type; and
generating a constraint-overlap result further includes correlating each constraint in the third subset to the result population using the correlation type.

10. The method of claim 9, wherein the correlation type includes one of Chi-square, Pearson, or Spearman.

11. The method of claim 9, further comprising determining in real time a requested correlation for at least one external behavior constraint type.

12. The method of claim 1, comprising:
one or more first layers and a processing layer wherein:
the one or more first layers comprise at least an interface layer and a service layer.

13. The method of claim 12, wherein each of a plurality of computing devices process one or more portions of work, the plurality of computing devices perform the work distributed by the one or more first layers by processing the portions of work in parallel.

14. A non-transitory computer-readable storage medium that includes data for generating information regarding an on-demand audience, wherein the data is executable by a processor to enable actions, comprising:
receiving by one or more processors and over a network, from a user device, a first request for a for a result population and a constraint-overlap result, the first request including:
a first constraint and a second constraint, wherein the first constraint and the second constraint are members of a set of constraints; and
a first time period, wherein:
the first time period begins prior to receiving the first request; and
the first time period ends prior to receiving the first request;
generating, using one or more processors, a first population from a database, wherein:
each first record of a plurality of first records in the first population satisfies the first constraint; and
each first record of the plurality of first records in the first population was created during the first time period;
generating, using one or more processors, a second population from the database, wherein:
each second record of a plurality of second records in the second population satisfies the second constraint; and
each second record of the plurality of second records in the second population was created a during the first time period;
generating, using one or more processors, the result population from the database wherein:
each result record of a plurality of result records in the result population satisfies the first constraint and/or satisfies the second constraint; and
each result record of the plurality of result records in the result population was created within the first time period;
generating a first subset of the set of constraints, wherein each constraint in the first subset includes an occurrence quantity defined based on a number of records in the first population for which the constraint is satisfied;
generating a second subset of the set of constraints, wherein each constraint in the second subset includes an occurrence quantity defined based on a number of records in the second population for which the constraint is satisfied;

generating a constraint-overlap result that includes a third subset of the set of constraints, wherein the third subset includes one or more constraints, each of the one or more constraints being included in both the first subset and the second subset, wherein each constraint in the third subset is a constraint in which a sum of the occurrence quantity for the constraint in the first subset and the occurrence quantity for the constraint in the second subset exceeds a threshold, and wherein the constraint-overlap result further includes a correlation for each constraint in the third subset, the correlation representing a degree of correlation between the constraint and the result population;

transmitting by one or more processors and over the network, to the user device, the result population and the constraint-overlap result; and receiving by one or more processors and over the network, from the user device, a second request for a different population, the second request including:
a third constraint selected from the third subset of the set of constraints included in the constraint-overlap result based on the correlation; and
the first time period or a different time period.

15. The non-transitory computer-readable storage medium of claim 14, wherein each result record of a plurality of result records in the result population satisfies the first constraint and satisfies the second constraint.

16. The non-transitory computer-readable storage medium of claim 14, wherein each result record of a plurality of result records in the result population satisfies the first constraint or satisfies the second constraint, but does not satisfy both of the first constraint and the second constraint.

17. The non-transitory computer-readable storage medium of claim 14, wherein each result record of a plurality of result records in the result population satisfies the first constraint or satisfies the second constraint.

18. The non-transitory computer-readable storage medium of claim 14, wherein:
the first request further includes:
a first frequency associated with the first constraint; and
a second frequency associated with the second constraint;
generating, using one or more processors, the result population from the database, includes:
each result record of a plurality of result records in the result population satisfies the first constraint and the first frequency; and/or
each result record of a plurality of result records in the result population satisfies the second constraint and the second frequency.

19. The non-transitory computer-readable storage medium of claim 18, wherein the first frequency and the second frequency are the same.

20. The non-transitory computer-readable storage medium of claim 14, wherein the second request includes the first constraint and/or the second constraint.

21. The non-transitory computer-readable storage medium of claim 14, wherein the first constraint or the second constraint includes at least one of an in-market type constraint, a demographic type constraint, a location type constraint, a visitation type constraint, and a season type constraint.

22. The non-transitory computer-readable storage medium of claim 14, wherein:
the first request further includes a correlation type; and
generating a constraint-overlap result further includes correlating each constraint in the third subset to the result population using the correlation type.

23. The non-transitory computer-readable storage medium of claim 22, wherein the correlation type includes one of Chi-square, Pearson, or Spearman.

24. The non-transitory computer-readable storage medium of claim 22, further comprising determining in real time a requested correlation for at least one external behavior constraint type.

25. The non-transitory computer-readable storage medium of claim 14, comprising:
one or more first layers and a processing layer wherein:
the one or more first layers comprise at least an interface layer and a service layer.

26. The non-transitory computer-readable storage medium of claim 25, wherein each of a plurality of computing devices process one or more portions of work, the plurality of computing devices perform the work distributed by the one or more first layers by processing the portions of work in parallel.

27. An apparatus for generating information regarding an on-demand audience, comprising one or more processors performing actions including:
receiving, by one or more processors and over a network, from a user device, a first request for a for a result population and a constraint-overlap result, the first request including:
a first constraint and a second constraint, wherein the first constraint and the second constraint are members of a set of constraints; and
a first time period, wherein:
the first time period begins prior to receiving the first request; and
the first time period ends prior to receiving the first request;
generating, using one or more processors, a first population from a database, wherein:
each first record of a plurality of first records in the first population satisfies the first constraint; and
each first record of the plurality of first records in the first population was created during the time first period;
generating, using one or more processors, a second population from the database, wherein:
each second record of a plurality of second records in the second population satisfies the second constraint; and
each second record of the plurality of second records in the second population was created a during the first time period;
generating, using one or more processors, the result population from the database, wherein:
each result record of a plurality of result records in the result population satisfies the first constraint and/or satisfies the second constraint; and
each result record of the plurality of result records in the result population was created within the first time period;
generating a first subset of the set of constraints, wherein each constraint in the first subset includes an occurrence quantity defined based on a number of records in the first population for which the constraint is satisfied;

generating a second subset of the set of constraints, wherein each constraint in the second subset includes an occurrence quantity defined based on a number of records in the second population for which the constraint is satisfied;

generating a constraint-overlap result that includes a third subset of the set of constraints, wherein the third subset includes one or more constraints, each of the one or more constraints being included in both the first subset and the second subset, wherein each constraint in the third subset is a constraint in which a sum of the occurrence quantity for the constraint in the first subset and the occurrence quantity for the constraint in the second subset exceeds a threshold, and wherein the constraint-overlap result further includes a correlation for each constraint in the third subset, the correlation representing a degree of correlation between the constraint and the result population;

transmitting by one or more processors and over the network, to the user device, the result population and the constraint-overlap result; and receiving by one or more processors and over the network, from the user device, a second request for a different population, the second request including:
a third constraint selected from the third subset of the set of constraints included in the constraint-overlap result based on the correlation; and
the first time period or a different time period.

28. The apparatus of claim 27, wherein each result record of a plurality of result records in the result population satisfies the first constraint and satisfies the second constraint.

29. The apparatus of claim 27, wherein each result record of a plurality of result records in the result population satisfies the first constraint or satisfies the second constraint, but does not satisfy both of the first constraint and the second constraint.

30. The apparatus of claim 27, wherein each result record of a plurality of result records in the result population satisfies the first constraint or satisfies the second constraint.

31. The apparatus of claim 27, wherein:
the first request further includes:
a first frequency associated with the first constraint; and
a second frequency associated with the second constraint;
generating, using one or more processors, the result population from the database, includes:
each result record of a plurality of result records in the result population satisfies the first constraint and the first frequency; and/or
each result record of a plurality of result records in the result population satisfies the second constraint and the second frequency.

32. The apparatus of claim 31, wherein the first frequency and the second frequency are the same.

33. The apparatus of claim 27, wherein the second request includes the first constraint and/or the second constraint.

34. The apparatus of claim 27, wherein the first constraint or the second constraint includes at least one of an in-market type constraint, a demographic type constraint, a location type constraint, a visitation type constraint, and a season type constraint.

35. The apparatus of claim 27, wherein:
the first request further includes a correlation type; and
generating a constraint-overlap result further includes correlating each constraint in the third subset to the result population using the correlation type.

36. The apparatus of claim 35, wherein the correlation type includes one of Chi-square, Pearson, or Spearman.

37. The apparatus of claim 35, further comprising determining in real time a requested correlation for at least one external behavior constraint type.

38. The apparatus of claim 27, comprising:
one or more first layers and a processing layer wherein:
the one or more first layers comprise at least an interface layer and a service layer.

39. The apparatus of claim 38, wherein each of a plurality of computing devices process one or more portions of work, the plurality of computing devices perform the work distributed by the one or more first layers by processing the portions of work in parallel.

* * * * *